(12) United States Patent
Bang-Andreasen

(10) Patent No.: US 11,031,756 B2
(45) Date of Patent: Jun. 8, 2021

(54) FOUNDATION INTERFACE DEVICE

(71) Applicant: Balmoral Comtec Limited, Aberdeen (GB)

(72) Inventor: Henrik Bang-Andreasen, Bergen (NO)

(73) Assignee: Balmoral Comtec Limited, Aberdeen (GB)

( * ) Notice: Subject to any disclaimer, the term of this patent is extended or adjusted under 35 U.S.C. 154(b) by 141 days.

(21) Appl. No.: 16/304,695

(22) PCT Filed: Jun. 6, 2017

(86) PCT No.: PCT/EP2017/063695
§ 371 (c)(1),
(2) Date: Nov. 27, 2018

(87) PCT Pub. No.: WO2018/211815
PCT Pub. Date: Dec. 14, 2017

(65) Prior Publication Data
US 2019/0280468 A1 Sep. 12, 2019

Related U.S. Application Data

(60) Provisional application No. 62/347,637, filed on Jun. 9, 2016.

(51) Int. Cl.
*H02G 1/08* (2006.01)
*H02G 1/10* (2006.01)
(Continued)

(52) U.S. Cl.
CPC ............... *H02G 1/081* (2013.01); *H02G 1/10* (2013.01); *H02G 3/0481* (2013.01); *H02G 3/22* (2013.01); *Y02B 10/30* (2013.01)

(58) Field of Classification Search
CPC ......... H02G 1/081; H02G 3/0481; H02G 3/22
(Continued)

(56) References Cited

U.S. PATENT DOCUMENTS 5,947,642 A    9/1999  Teixeira et al.
8,016,520 B2 * 9/2011  Dybvik ................. B63B 21/50
                                                         114/293
(Continued)

FOREIGN PATENT DOCUMENTS

DE   3838601       5/1990
EP   2329174 A2    6/2011
(Continued)

OTHER PUBLICATIONS

Third Party Observation for Application No. EP20170730426 dated Feb. 5, 2019 (3 pages).
(Continued)

*Primary Examiner* — Brian D Keller
(74) *Attorney, Agent, or Firm* — SmithAmundsen LLC

(57) ABSTRACT

A foundation interface device for pulling a cable (16) that is arranged in a conduit into a structure. The interface device has a flexible, generally cylindrical pull-in member (12) that is connected to the conduit. At the leading end of the pull-in member is a weak link latch having releasable arms (72) connected to the pull-in member and connection piece (66) connected to the cable. At the rear of the pull in member is a slidable sleeve operably connected to extendable teeth (40). The slidable sleeve has an abutment (36) that contacts an opening of the structure when the interface device is pulled into the opening, causing the sleeve to slide rearward at thus extending the teeth to lock the interface device in the opening.

20 Claims, 15 Drawing Sheets

(51) Int. Cl.
  *H02G 3/04* (2006.01)
  *H02G 3/22* (2006.01)

(58) Field of Classification Search
  USPC ............... 254/134.3 FT, 134.3 R; 405/195.1,
  405/223.1, 224, 224.2
  See application file for complete search history.

(56) References Cited

U.S. PATENT DOCUMENTS

| | | | |
|---|---|---|---|
| 9,249,899 B2 * | 2/2016 | Bang-Andresen | ....... H02G 1/10 |
| 10,199,808 B2 * | 2/2019 | Bang-Andreasen | ..... H02G 1/10 |
| 2011/0226527 A1 * | 9/2011 | Ritchie-Bland | ......... F03D 80/00 |
| | | | 174/669 |
| 2014/0255102 A1 | 9/2014 | Bang-Andresen et al. | |

FOREIGN PATENT DOCUMENTS

| | | |
|---|---|---|
| GB | 2424684 A | 10/2006 |
| WO | WO2005/095198 A1 | 10/2005 |
| WO | 2010/038056 | 4/2010 |

OTHER PUBLICATIONS

Office Action from the Japanese Intellectual Property Office for Application No. 2018-564878 dated Feb. 27, 2021 (8 pages).

* cited by examiner

FOUNDATION INTERFACE DEVICE

CROSS REFERENCE TO RELATED APPLICATIONS

This application is filed on the same day as the application by the same applicant entitled, "Weak Link Latch", application No. 62/347,636, the entire specification and drawings of which are hereby incorporated by references as if reproduced here verbatim.

FIELD OF THE INVENTION

The invention relates to cables and flexibles, in particular to methods for pulling and protecting cables such as offshore cables and more particularly to mechanical connections between cables and a structure.

BACKGROUND

Cables, in particular cables used in the offshore industry, can be extremely long and heavy. The cables must often be pulled from one location to another, requiring great pulling forces up to several tons. The cables must often be protected from the environment and physical impacts, and in certain applications cables are arranged concentrically inside a protective conduit that is pulled along with the cable and secured to a structure. An example of such an application is cables stretched between offshore wind turbines, transformer stations and the like. Another example of such an application is flexibles stretched between offshore production platforms.

One method of pulling a cable arranged inside a protective conduit is affixing the cable inside the conduit so that it will not move relative to the conduit. A pulling line can then be attached to just the conduit, and the entire arrangement will follow.

In many applications, however, it is necessary that the cable be freely movable in the longitudinal direction inside the conduit. For example, when a cable is pulled from the foundation of one wind turbine to another, the protective conduit is pulled to, and enters the foundation of the structure, either at an opening at the base of the foundation or through an entry device known in the art as a J-tube. The internal cable, however, must be pulled further up inside the foundation to a hang-off point, often located in a deck above the water surface.

In such an application it is desirable that the conduit be secured to the entry point of the foundation, to ensure that the conduit is not pulled back out of the foundation by the weight of the cable arrangement, by currents or other forces. A prior art solution to this problem is disclosed in EP2329174. As shown therein, a lockable pull-in member is arranged at the end of the conduit. The pull-in member comprises a flexible bend restriction section at its leading end, and a locking segment at its trailing end. The flexible bend restriction section is made of a polymer material, while the locking segment is in the form a rigid, cylindrical steel body with an abutment portion at its base that has a larger diameter than the entry hole. The locking segment further comprises a plurality of biased, spring-loaded fingers spaced a distance forward of the abutment portion. The fingers, being biased in the extended position, spring out to engage the inside of the opening to prevent the conduit from being pulled back out of the structure. As further shown therein, a single pull-in line connects to both the protective conduit and the internal cable by a weak link arrangement in the form of two separate wire leaders. The wire leaders have different breaking strengths, with the leader attached to the conduit having a lower breaking strength than the leader for the cable. In use, the arrangement is pulled into an opening in a foundation until the abutment portion contacts the foundation wall. The pull line pulls with increasing force until the conduit's wire leader breaks. Subsequently, the cable is pulled up into the foundation using its stronger leader.

The pull-in device of EP2329174 has a number of disadvantages, however. Because the flexible bend restriction section and the locking segment are separate components made of different materials, they must be connected to one another at a joint interface. Such a joint interface is an inherent weak point, prone to failure due bending and moving forces experienced in an underwater environment. This is critical, since the device may be required to remain in place for many years. The joint interface further prevents the bend restriction section from achieving an adequate curvature when the pulling force of the pull line originates from an essentially vertical direction. The lack of adequate curvature creates a force vector that necessitates a greater pulling force than otherwise required to break the weak link wire and also stresses the joint. Further, the biased fingers of the locking segment are a complicated arrangement, requiring several rows of fingers spaced apart in the longitudinal direction of the locking segment.

SUMMARY OF THE INVENTION

The present invention has as its object to overcome one or more of the disadvantages of the prior art, or to provide an alternate mechanical interface solution between a cable arrangement and a structure. It should be understood that while the invention will be described in the context of an offshore cable disposed within a protective conduit arranged to be introduced through an aperture or hole of the foundation of a wind turbine, the invention is also useful for any situation where a flexible member is required to be hung-off (mechanically interlocked to) an apparatus.

According to one aspect, the present invention provides a foundation interface device comprising an elongated pull-in member for connection to a leading end of a flexible, elongated cylindrical conduit in which is arranged a cable. The pull-in member has a longitudinal central bore. The pull in member according to one embodiment is essentially cylindrical at its trailing end with a diameter essentially equal to the diameter of the conduit, said trailing end arranged for connection to the leading end of the conduit by connection means known in the art. The pull-in member tapers to a smaller diameter at its leading end. The pull-in member is formed as a continuous piece, preferably made of a strong and flexible material such as fibre reinforced polymer. Examples of such material include strong isometric polymers (high tear strength) without fibre re-inforcement, polymers with short fibre members randomly arranged in the polymeric material, «continous length» fibres arranged inside polymerics, all types of re-inforcement (other than fibres) such as steels or alloys, glass-fibre-reinforced plastics (GRP's) and Epoxy's and vinyl esters.

At least a front portion of the pull-in member is flexible, with a degree of flexibility allowing the front end to function as a bend restrictor for protecting the cable from damage due to excessive bending.

Attached to the leading end of the pull-in member is a weak link latch, although other weak link arrangements are possible. Such a weak link arrangement has a first part connected to the pull-in member (which in turn is connected to the conduit) and a second part connected to the cable. The first part is arranged to disengage from the pull-in member when certain predetermined conditions are met, such as for example a predetermined pulling force. The disengagement could also be triggered remotely. The purpose of the weak link arrangement is to permit a single pull line to pull both the conduit (via the pull-in member) and the internally arranged cable with a single pull in line. As described below, when the pull-in member abuts against a structure, the weak link will disengage from the pull-in member when a predetermined pulling force is reached. Because the weak link arrangement remains connected to the cable, the pull-in line may continue to pull the cable further into the structure.

At the trailing end of the pull-in member a slidable sleeve is arranged about the circumference of the pull in member. The slidable sleeve is arranged to slide in the longitudinal direction of the pull-in member. The slidable sleeve has an abutment portion at its base, the abutment portion being larger in diameter than the opening of the foundation into which the pull-in device is to be pulled. The slidable sleeve is connected to extendable teeth members at its forward end by a linkage, whereby the longitudinal movement of the sleeve is transferred to a lateral extension of the teeth members. The teeth are in a retracted position when the sleeve is in an initial forward position and are moved to an extended position when the sleeve slides to a rearward position. According to one embodiment the teeth members are rotatably connected to an axle pin, with the longitudinal movement of the sleeve causing the teeth to rotate to the extended position. According to another embodiment the longitudinal movement of the sleeve forces the teeth to slide upon a ramp section to the extended position. The teeth, when in the extended position, prevent the pull-in member from being pulled back out of the opening.

In use, the pull-in device is pulled into the opening of a structure until the abutment portion of the slidable sleeve contacts the outer wall of the structure. The pull-in line continues to exert a pulling force, causing the slidable sleeve to move from its initial forward to a rearward position, whereby the linkage with the teeth causes the teeth to extend into engagement with the inner wall about the opening. The pull-in line continues to pull until the weak link arrangement disengages from the pull-in member, and the cable is thereafter pulled up to a hangoff point.

According to one aspect, the movable sleeve further comprises a locking mechanism that prevents the sleeve from sliding forward to the initial position once the teeth are extended. This allows the interface device of the invention to remain locked in its engagement with the structure. According to one aspect, the locking mechanism is a snap latch comprising a locking pin with a head piece. The head piece has a larger diameter than a corresponding hole in a collar at the read end of the pull-in member. When the sleeve slides to the rear position, the head of the locking pin is forced into locking engagement with the hole in the collar. One embodiment of this arrangement utilizes a deformable material for the head piece. According to another aspect, the locking mechanism comprises a one-way hydraulic valve arrangement. According to yet another aspect, the locking mechanism comprises having a high friction interface requiring a certain threshold to force the slidable sleeve to move back to its initial forward position.

The slidable sleeve of the interface device according to one aspect further comprises a release mechanism that forces the sleeve forward to its initial position, thereby causing the teeth to retract. This allows the pull-in member to be removed from the opening. According to one aspect, the release mechanism comprises a threaded opening in a collar against which the abutment portion of the sleeve rests when in the rearward, locked position. A threaded bolt or key is inserted into the threaded opening and rotated. The bolt protrudes from the collar, and presses the abutment portion forward until the locking mechanism disengages, and by operating the release mechanism pushes the sleeve back to its initial position. In the case of a snap latch, the forward movement causes the head to deform at a predetermined forward pressure. Alternatively the head may be arranged to break off. According to another aspect, the release mechanism comprises a hydraulic valve. Pressurized hydraulic fluid, water or air is introduced into a valve, forcing a piston attached to the movable sleeve to move forward until the locking mechanism is disengaged. A reservoir may be employed without the use of a piston as well.

BRIEF DESCRIPTION OF THE DRAWINGS

The invention will be described in detail with reference to the following figures, wherein.

DETAILED DESCRIPTION

The invention will be described in the context of a cable arrangement, in which an offshore cable is concentrically arranged inside a flexible, protective conduit. Such conduit is typically made of a tough, flexible polymer material, designed to withstand impact, abrasion and other forces during an offshore pulling operation, and during the life of the cable. The interface device of the invention is connected to a leading end of the conduit by means known in the art, such a flange coupling. By virtue of the coupling, a pull-line that pulls the interface device of the invention will likewise pull the conduit and internal cable. One skilled in the art will recognize other use scenarios, such as pulling and securing cables arranged in conduits between onshore installations, inside buildings and vessels and the like.

Figure 3:
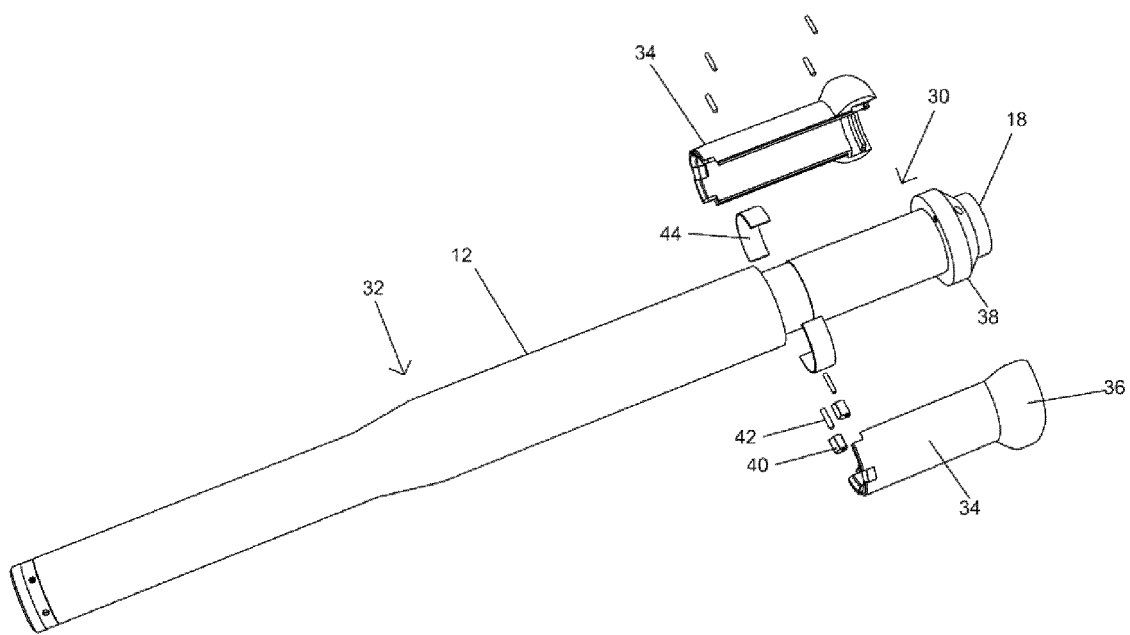
FIG. 3 is an exploded view of a portion of the device of the invention
Figure 4:
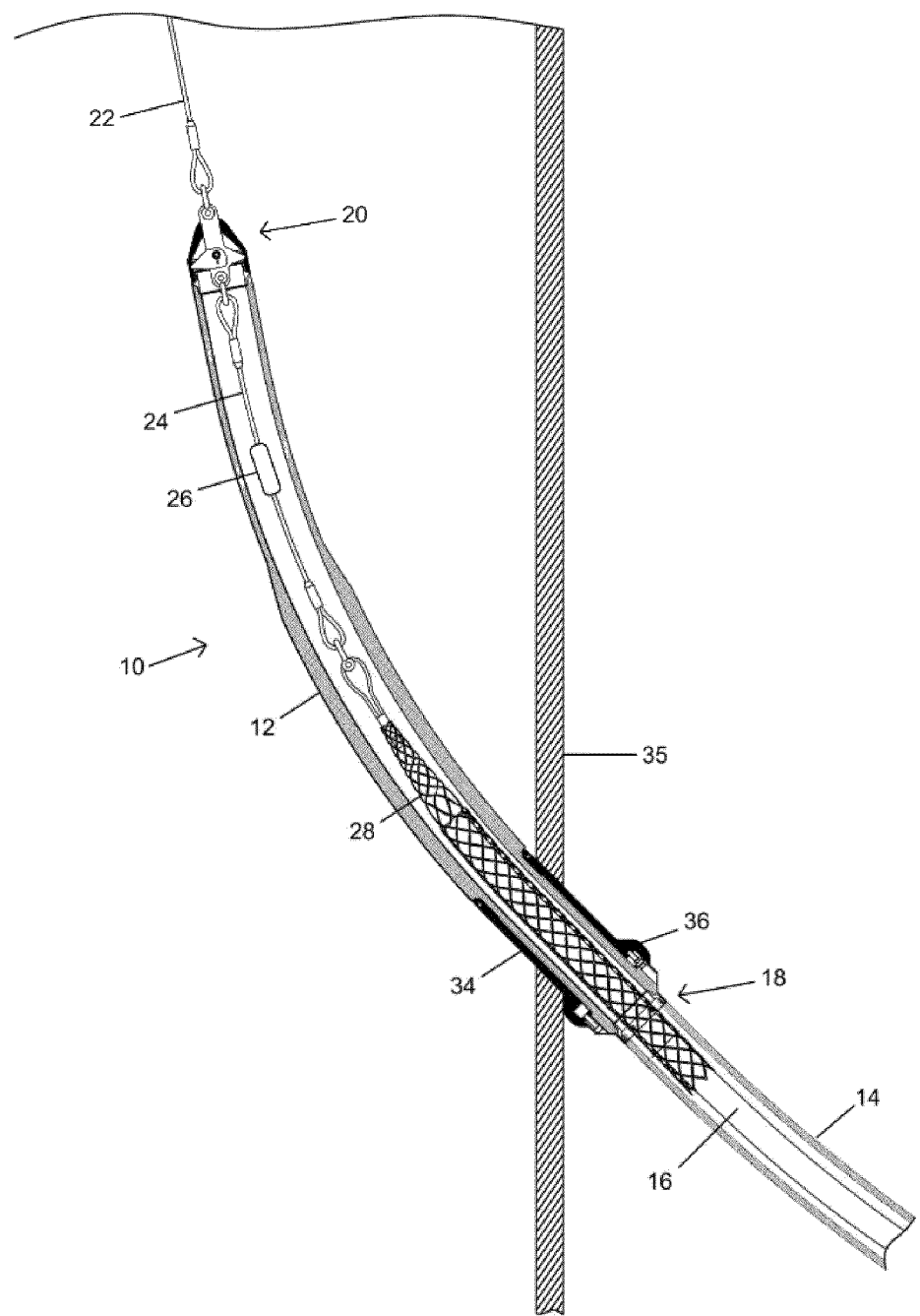
FIG. 4 is a side cross sectional view of the invention inserted in an underwater opening in the side of a structure

As shown in the figures, the interface device 10 of the invention comprises an elongated pull-in member 12. The interface device 10 is arranged to be connected to a conduit 14 having an internally arranged cable 16 by a coupling 18, as shown in FIG. 4. At a leading end of the pull-in member is a weak link latch device 20. The weak link latch device is connected at its leading end to a pull line 22 and connected to the internally arranged cable by a connection line 24, shown in FIG. 4. The connection line may optionally include a shock absorbing member 26. The connection line is typically secured to the cable via constriction sleeve 28, although other connection means are possible. As shown in FIG. 3, the pull-in member 12 has a rearward, essentially cylindrical section 30 and a forward tapered section 32. The pull-in member according to one aspect of the invention is made as a single piece, preferable of a high strength polymer material. At least the forward section of the pull-in member has the requisite flexibility to function as a bend restrictor, the parameters of said flexibility being known to one skilled in the art of bend restrictors. The rearward cylindrical section preferably has a lesser degree of flexibility than the forward section, permitting it to retain its essentially cylindrical shape when pulling forces are exerted on the forward section.

As shown in FIG. 3, the rearward cylindrical section 30 has an area of reduced diameter, about which is arranged a slidable sleeve 34. While FIG. 3 shows sleeve 34 as two half sections, the sleeve can alternately be a whole sleeve. In such case the couple member 18 can be arranged to be removable to permit assemble of the slidable sleeve about the pull-in member.

Slidable sleeve 34 has an abutment portion 36 at its base. The abutment portion has a diameter greater than the opening though which the interface device is to be inserted, such an opening in the foundation of a structure such as a wind turbine, the mouth of a J-Tube or the like.

Figure 1:
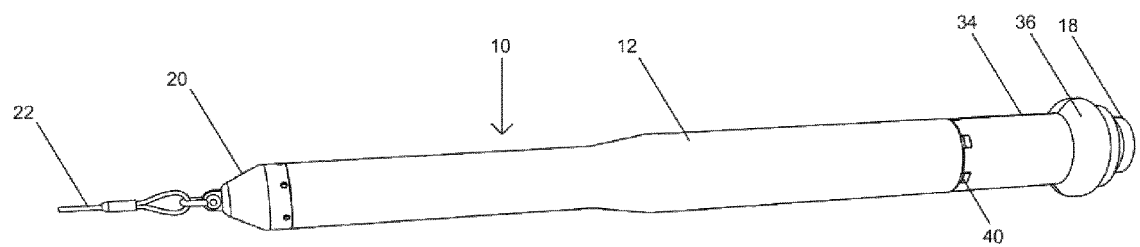
FIG. 1 is a perspective view of an embodiment of the interface device of the invention, with a slidable sleeve in an initial forward, disengaged state.
Figure 2:
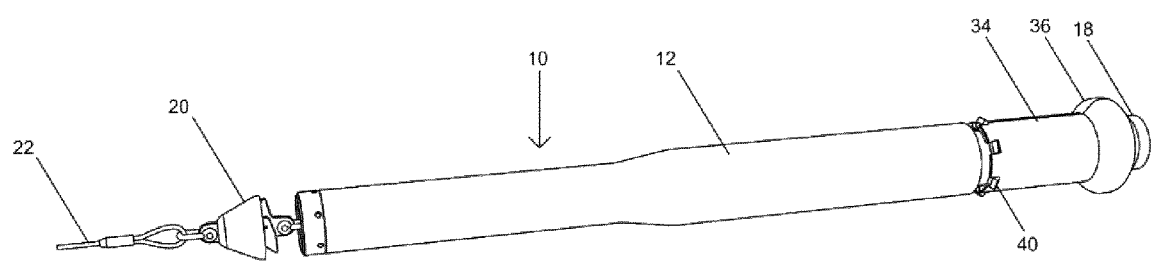
FIG. 2 is the view from FIG. 1, with the slidable sleeve in a rearward, engaged state.
Figure 5:
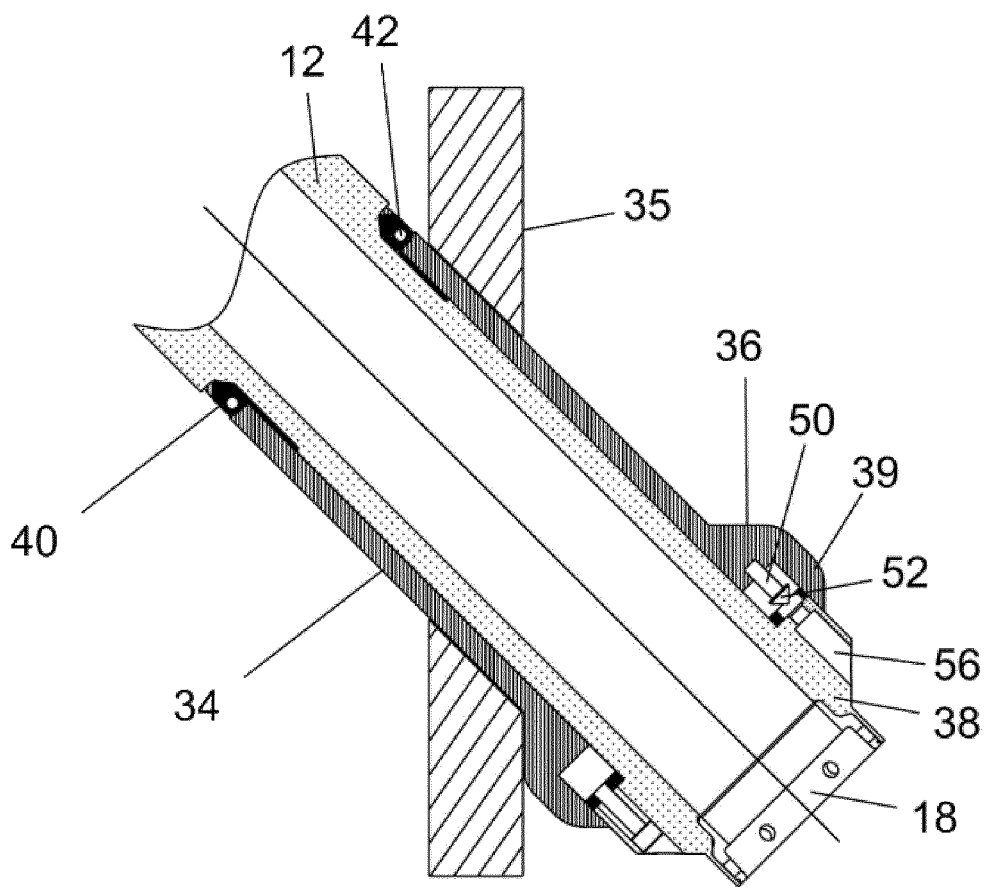
FIG. 5 is a detailed cross sectional view of the slidable sleeve in the forward position
Figure 6:
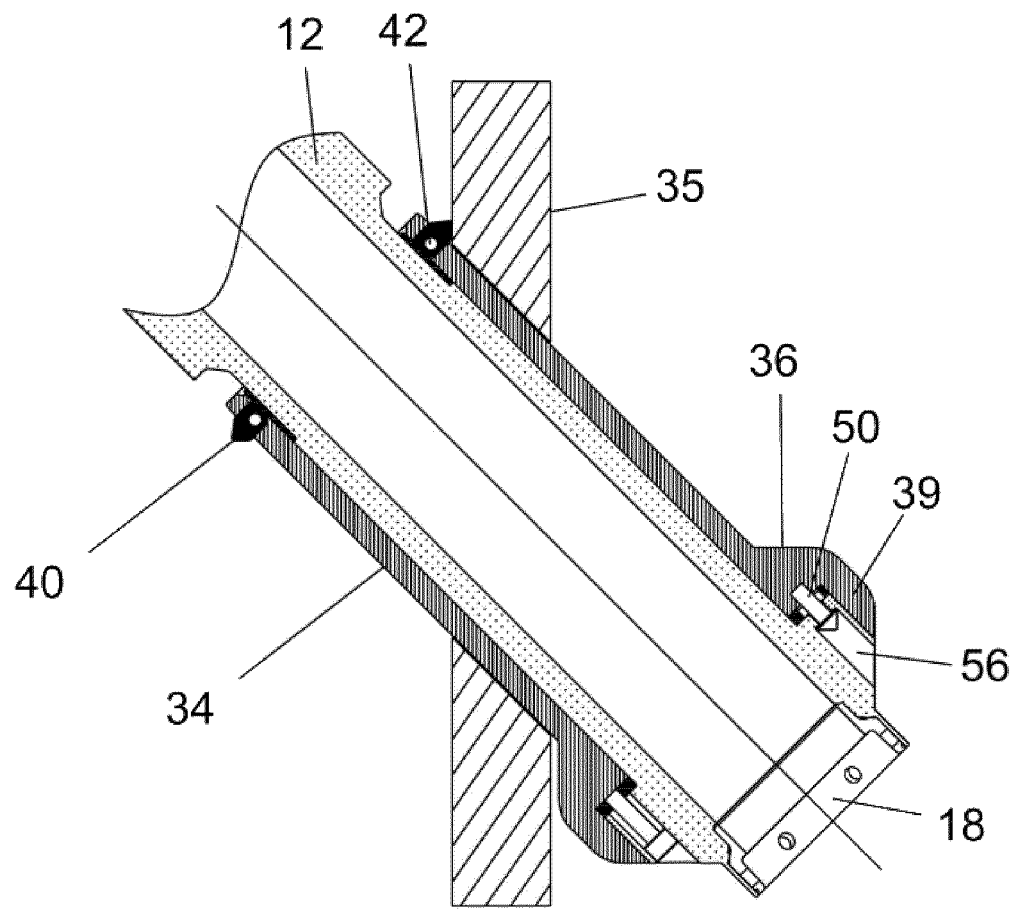
FIG. 6 is a detailed cross sectional view of the slidable sleeve in the rearward position FIGS. 7 *a-d* are detailed views showing the successive operation of a linkage mechanism transferring longitudinal movement of the sleeve to a lateral extension, via rotation, of the teeth members
Figure 13:
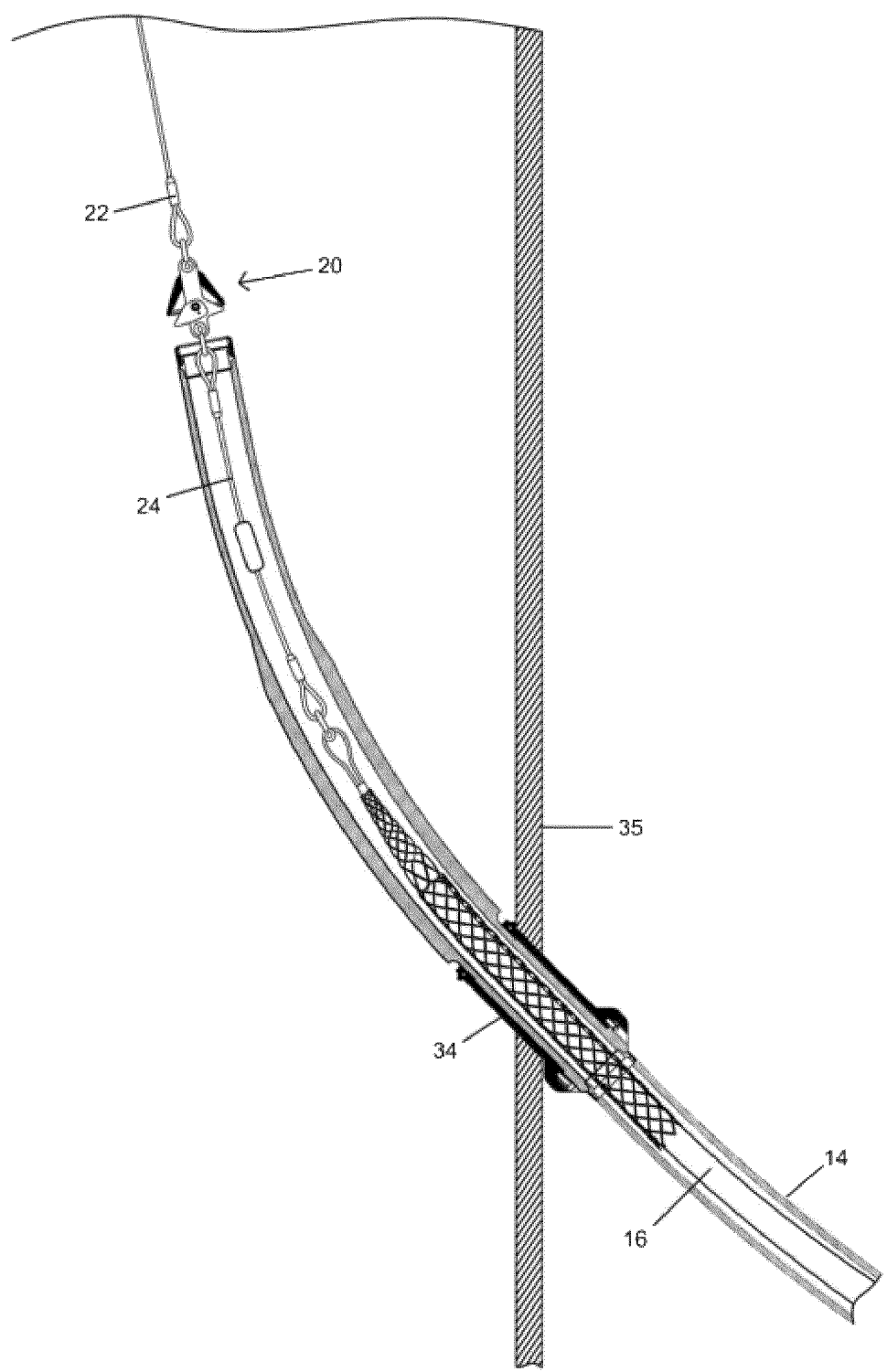
FIG. 13 is a cross sectional view of the invention, where the pulling line has disengaged the weak link latch

As shown in FIGS. 1 and 2 as well as 5 and 6, sleeve 34 is slidable from an initial forward position as seen in FIGS. 1 and 5, to a subsequent rearward position as shown in FIGS. 2 and 6. In the rearward position, sleeve 34 abuts against a collar 38 at the trailing end of the pull-in member 12. Alternately, collar 38 can be a part of coupling 18. As shown in FIG. 5, the abutment portion 36 has a rearward projecting lip 39 of sufficient length to cover the gap between the abutment portion 36 and collar 38 when sleeve 34 is in the forward position. The lip 39 prevents dirt and debris from entering the gap and interfering with the sliding movement of the sleeve. In use, pull line 22 will pull the interface member into the opening in the structure until abutment portion 36 contacts the outer wall of the structure. Further pulling forces slidable sleeve 34 to slide from its initial forward position as shown in FIG. 4 to its subsequent rearward position, in abutment with collar 38, as shown in FIG. 13.

Figure 7:
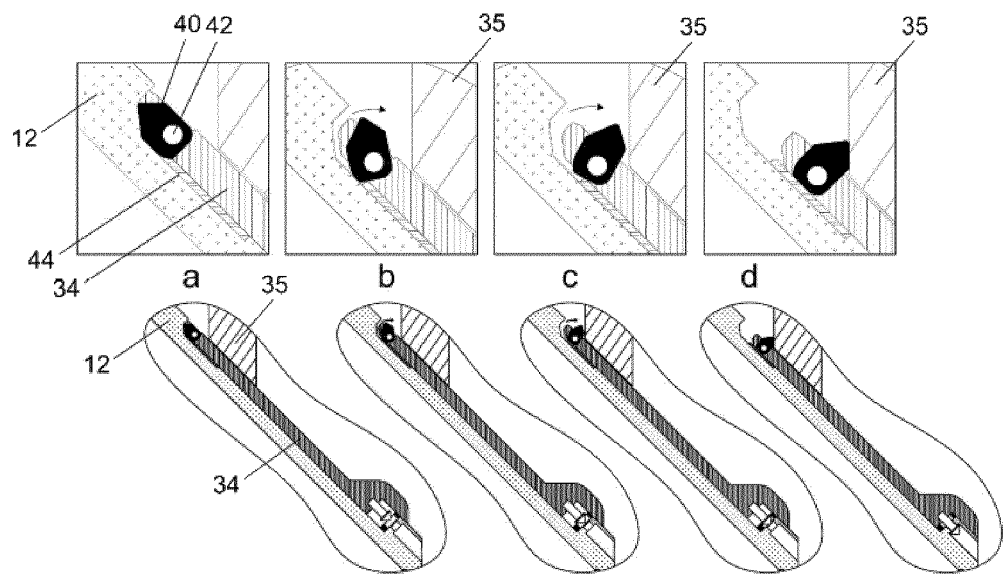
Figure 8:
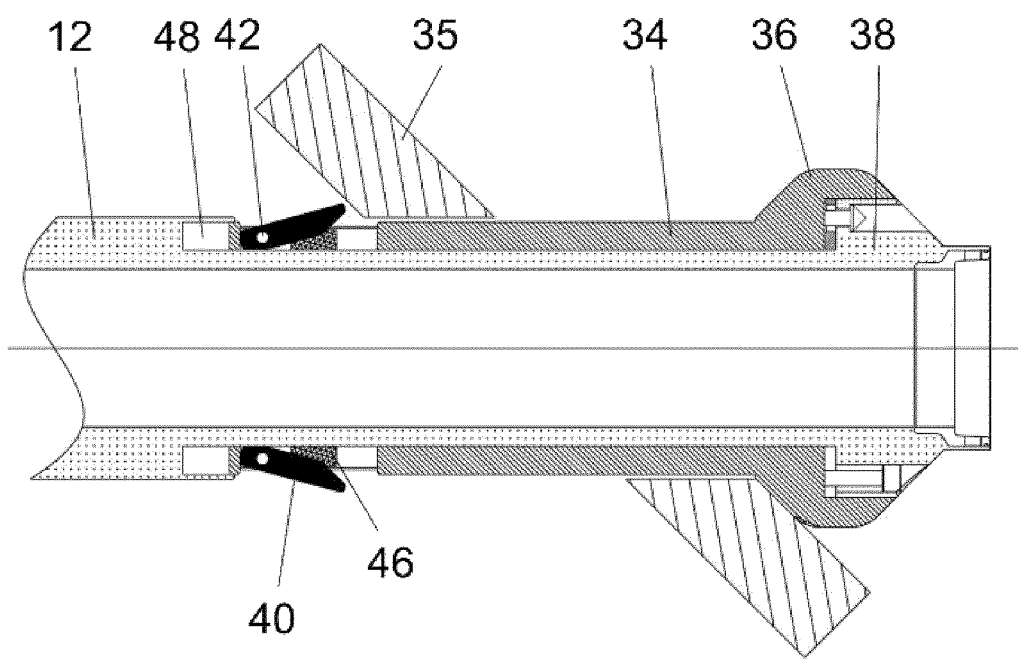
FIG. 8 shows an alternate embodiment of a linkage mechanism, whereby the teeth are force up a ramp into an extended position

The longitudinal movement of sleeve 34 from the forward position to the rearward position causes the lateral extension of one or more teeth 40 arranged at the leading end of sleeve 34. The longitudinal movement of the sleeve is transferred to the lateral extension of the teeth via a linkage. A first embodiment of the linkage arrangement is shown in FIG. 7, and an alternate embodiment is shown in FIG. 8. In the first embodiment, teeth 40 are rotatably connected to sleeve 34 about an axle pin 42. Teeth 40 are arranged such that a lower corner contacts a plate 44 when sleeve 34 is in the forward position, as shown in FIG. 7a. As illustrated in FIGS. 7 b-d, as sleeve 34 is forced towards the rearward position, the lower corner of the teeth contact the plate and are forced to rotate into the laterally extended position, as seen in FIG. 6. The contact surface between the bottom of the teeth and plate 44 prevents teeth 40 from rotating back so long as the bottom of the teeth rest upon the plate 44.

In the embodiment in FIG. 8, teeth 40 are arranged in an initial, lying orientation when sleeve 34 is in the forward position. As the sleeve is moved backwards, teeth 40 are forced up upon a ramp section 46. According to one aspect, the teeth in this embodiment can be protected inside a pocket 48 when the sleeve 34 is in the forward position.

Teeth 40 may be made of any appropriate and robust material, depending upon the nature of the application and the forces to be encountered. In the most challenging environments, for example in the case of offshore cables, the teeth may be steel. In less challenging applications the teeth may be a robust polymer material.

It should be understood that the relative dimensions of the teeth shown in the drawings are for illustration purposes only, and the lengths and thicknesses of the components may be varied depending upon the use scenario for the device.

Figure 9:
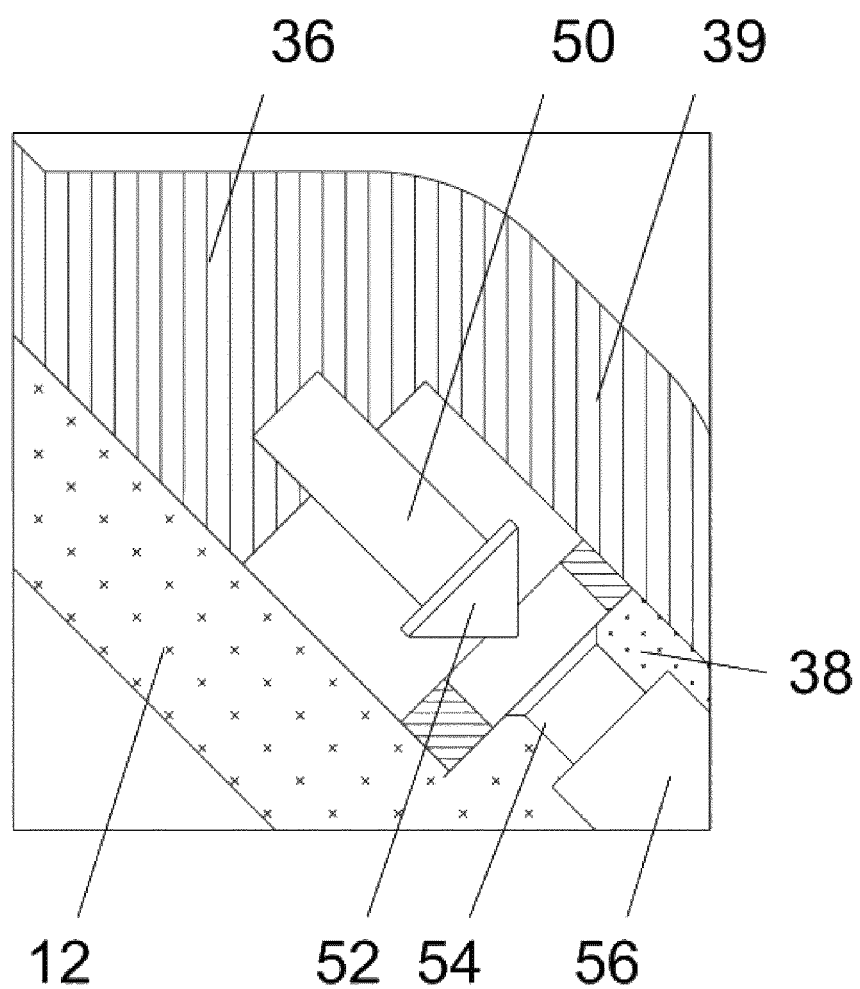
FIG. 9 is a detailed view of a locking mechanism of the sleeve in an unlocked state
Figure 10:
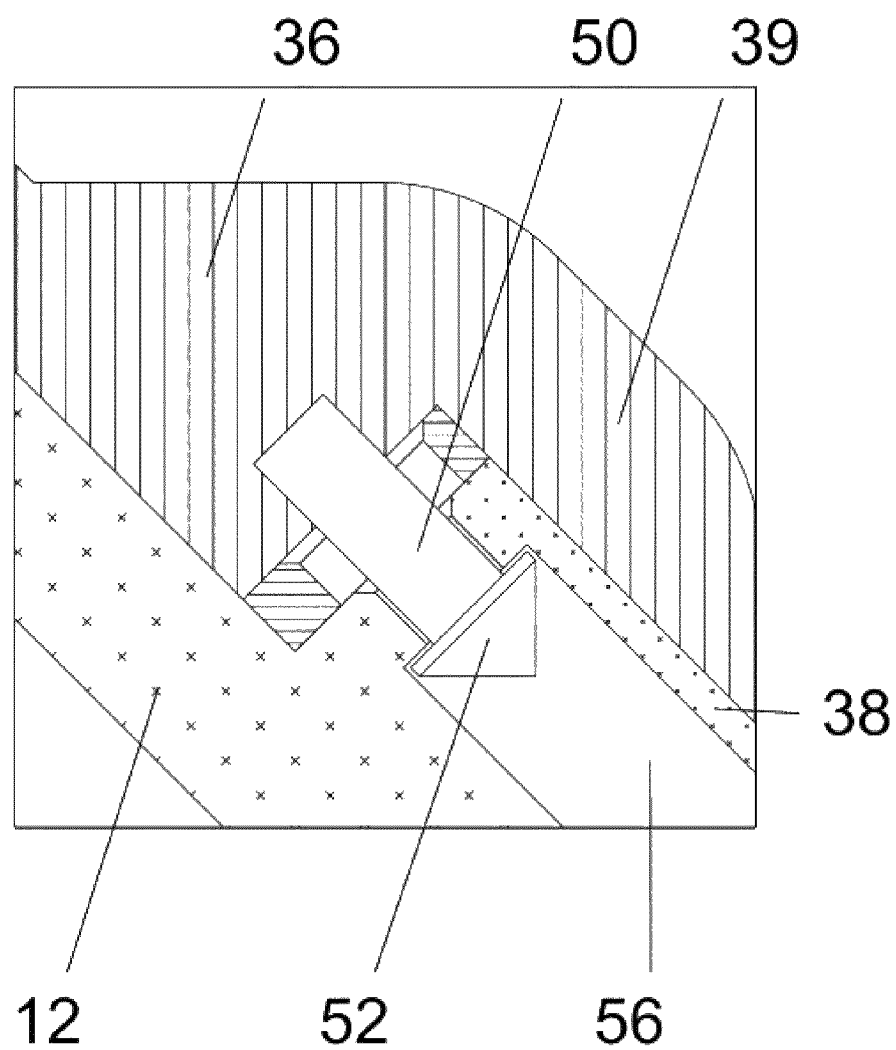
FIG. 10 is a detailed view of a locking mechanism of the sleeve in an locked state

Once the interface device has been pulled into an opening such that the sleeve is forced to the rearward position, with the teeth engaging the inside of the wall of the structure, it is desirable to lock the sleeve in place so the teeth remain extended. This prevents the device from being pulled back out of the opening by the weight of the cable, currents and other forces. The figures, and in particular FIGS. 9 and 10, illustrate an embodiment of a locking mechanism. According to the illustrated embodiment, a rearward-facing pin 50 is arranged projecting from the back end of the abutment portion 36 in the direction of collar 38. As seen in FIG. 9, pin 50 is protected by lip 39, which covers the gap between abutment portion 36 and collar 38. Pin 50 has a conical head 52. The diameter of head 52 is slightly larger than an opening 54 of a chamber 56 in collar 38. Head 52 is made of a deformable material, such that the head is forced into a snap fit in opening 54 when sleeve 34 slides to its rearward position under sufficient pulling force.

Figure 11:
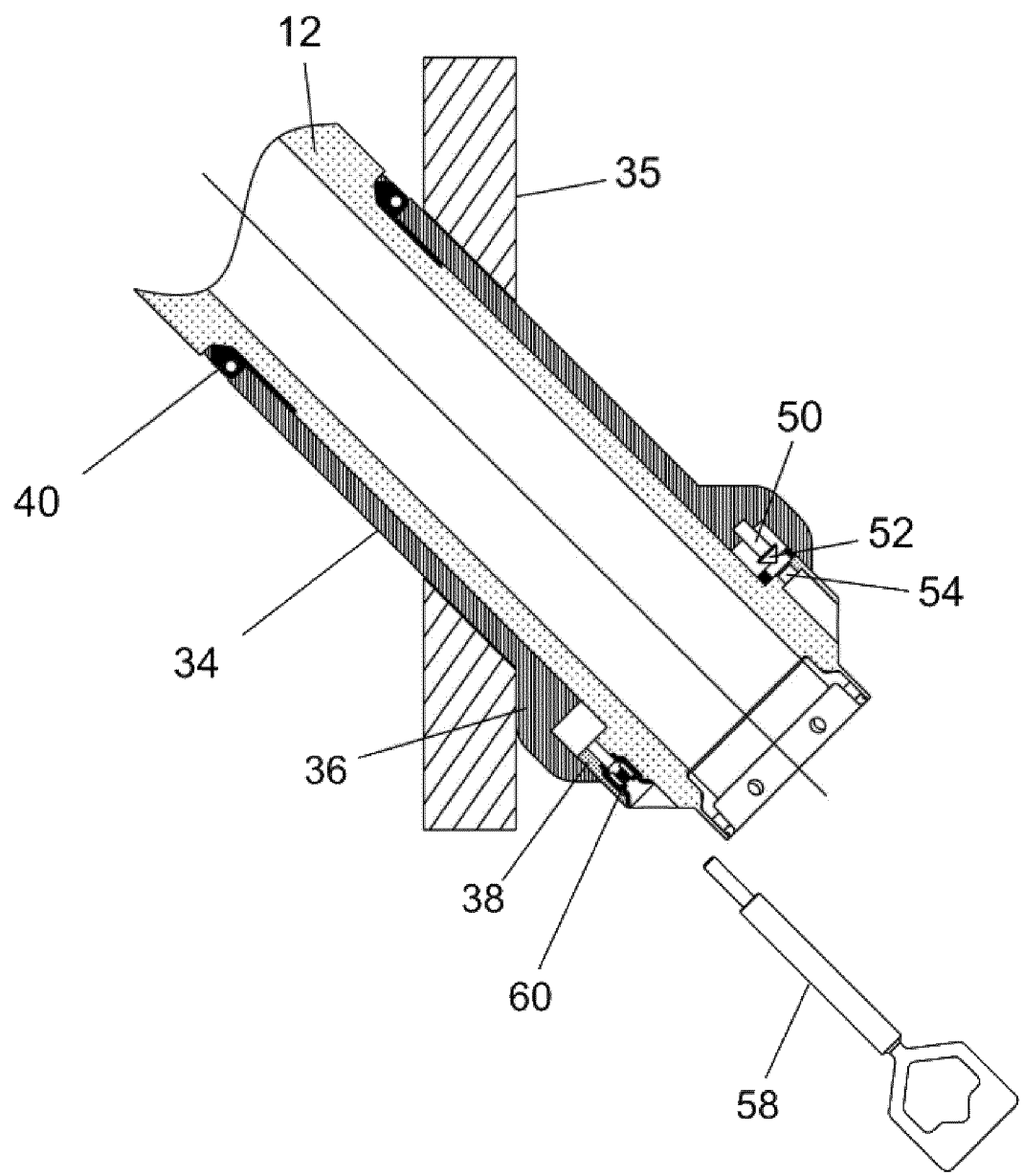
FIG. 11 is a detailed cross sectional view illustrating an embodiment of a release mechanism
Figure 12:
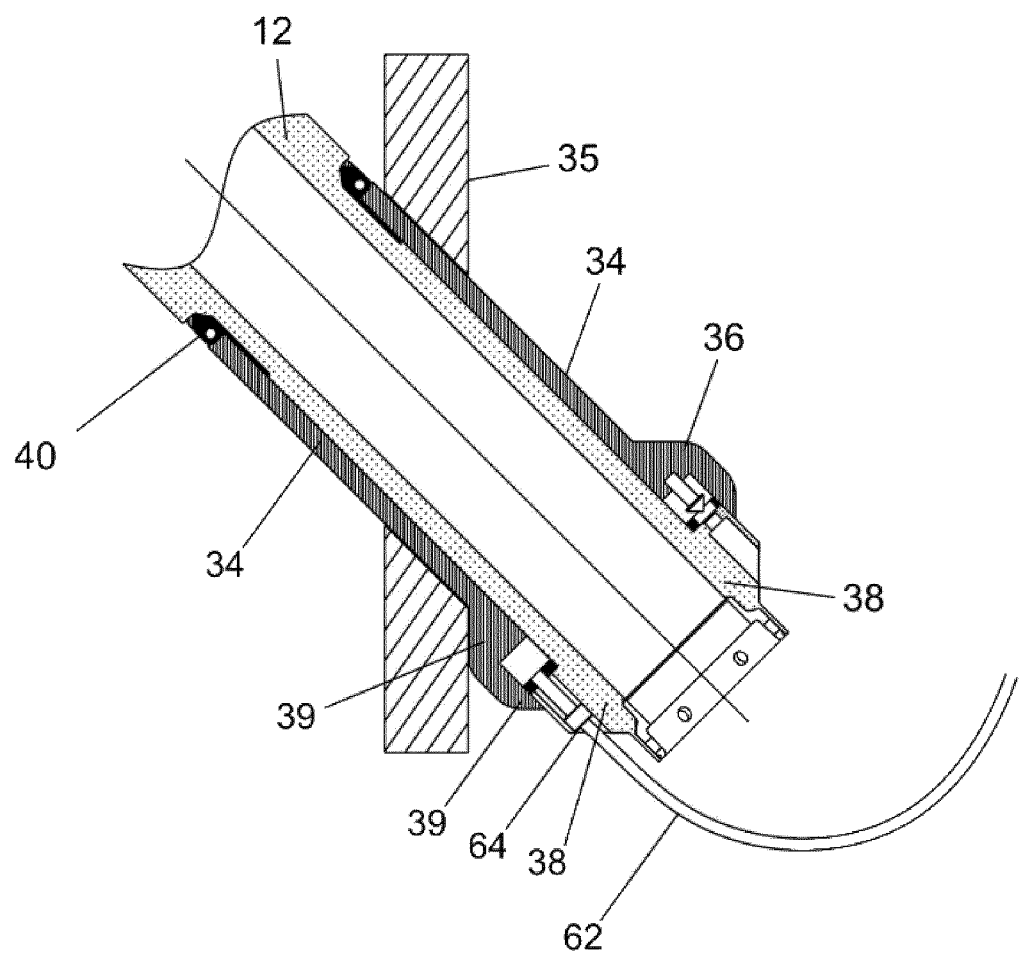
FIG. 12 is a detailed cross sectional view illustrating an alternate embodiment of a release mechanism

FIGS. 11 and 12 illustrate alternate embodiments of a release mechanism that is used to unlock the sleeve in the event the device of the invention is to be removed from the opening. In the embodiment of FIG. 11 a threaded bolt or key 58 is insertable in a corresponding threaded passage 60 in collar 38. Rotating the key, for example with a ROV, will extend the bolt past the collar and into contact with the back end of abutment portion 36. Continued rotation will either force head 52 to deform and be pressed out of opening 54. Head 54 may alternatively be arranged to break at a predetermined force. In the alternative illustrated in FIG. 12, a pressure hose is connected to a valve 64. A pressurized fluid is introduced into the gap between collar 38 and abutment portion 36, in order to force the sleeve 34 forward and disengage the locking mechanism. In this embodiment, a tight seal between lip 39 and collar 38 is advantageous.

Figure 18:
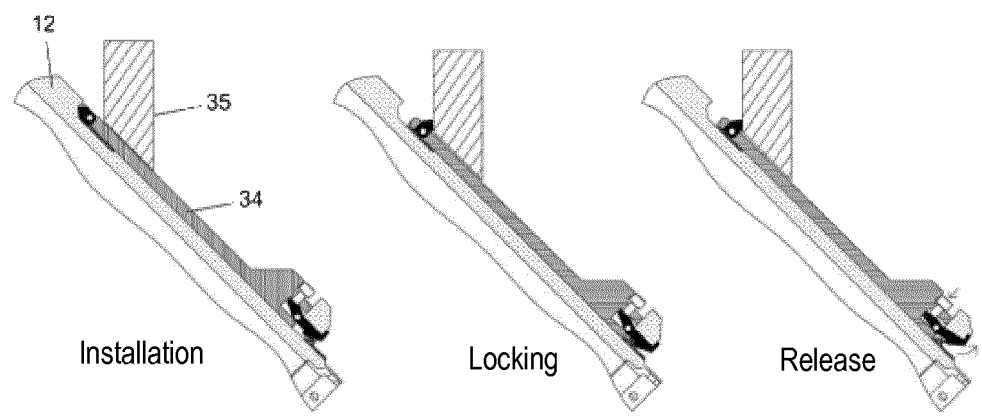
FIGS. 18 and 19 are side cross sectional view of an alternate locking and release mechanism
Figure 19:
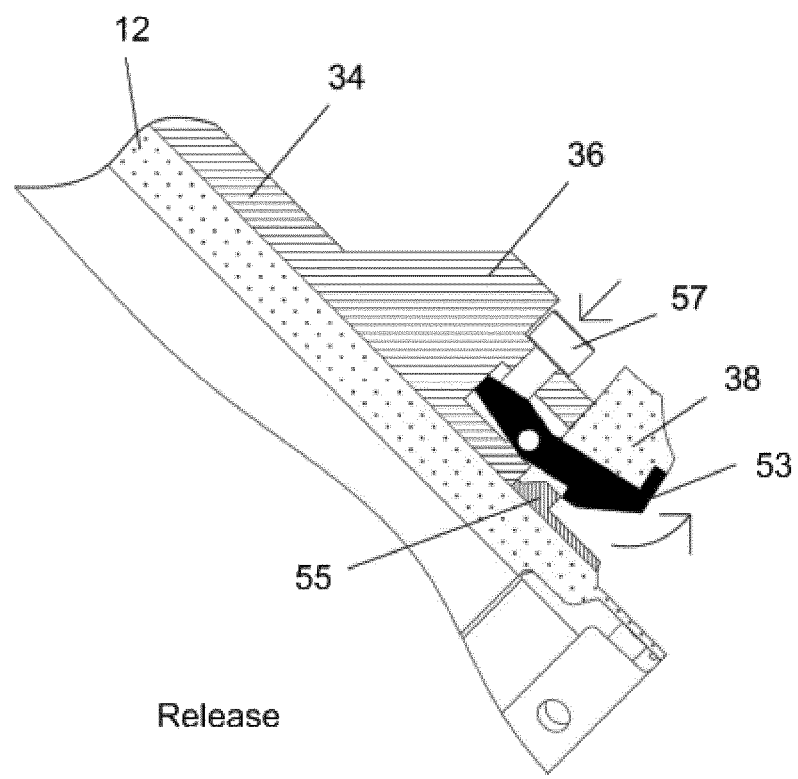

An alternate embodiment of a locking and release mechanism is illustrated in FIGS. 18 and 19. This embodiment is illustrated in connection with the version of teeth extension shown in FIG. 7, but may also be employed with the version shown in FIG. 8. In this embodiment, abutment portion 36 comprises a rocker arm 53 with a notch that engages a ridge 55 preferably in or a part of collar 38. Rocker arm is biased into downward, locking engagement with the ridge by a plunger 57. As the sleeve moves to the rearward position, the rocker arm will snap into locking engagement with the ridge. Pressing down on plunger 57 will thus cause rocker arm 55 to rotate into a disengaged position from the ridge, allowing the interface device to be removed from the opening.

An alternate embodiment of a locking mechanism employs one way or reversible hydraulic valves, where a piston and piston head attached to the abutment section is arranged in a piston chamber in collar 38.

Figure 14:
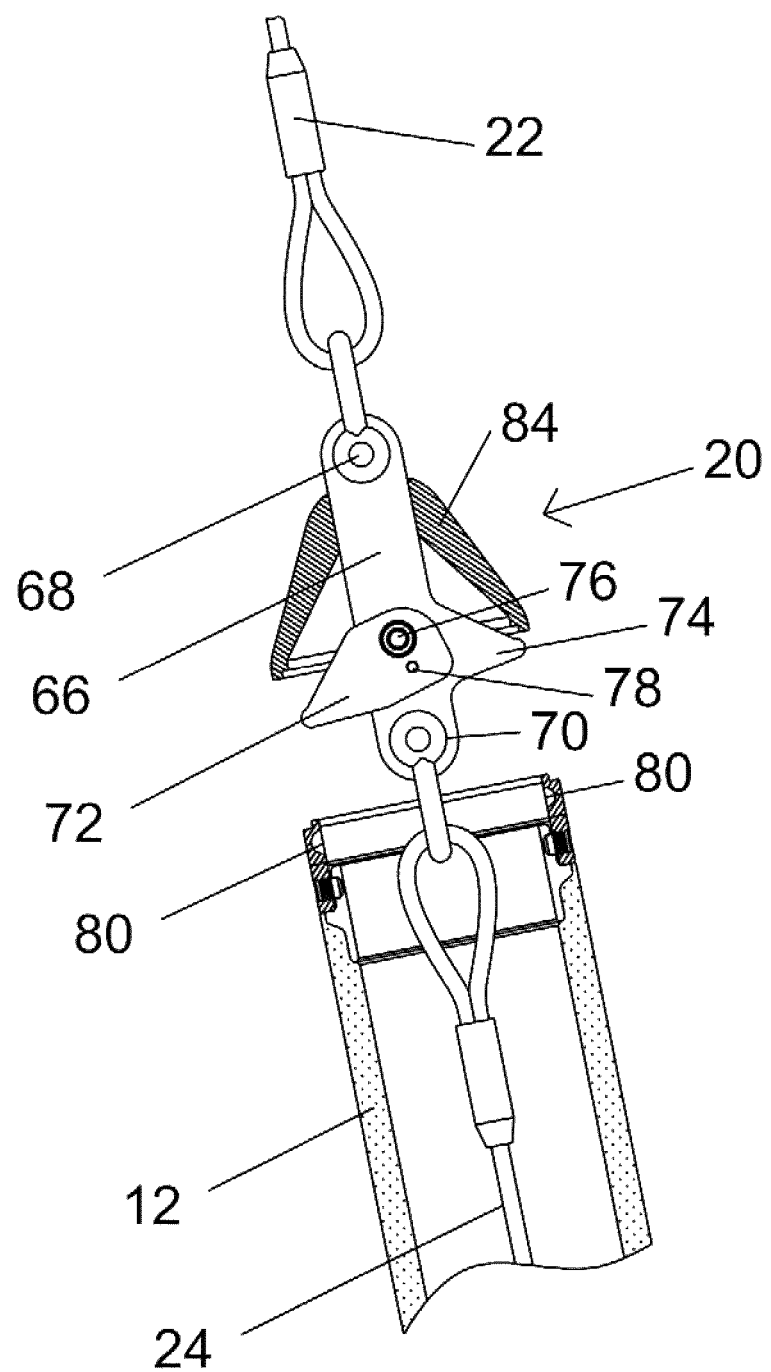
FIG. 14 is a detailed cross sectional view of the weak link latch
Figure 15:
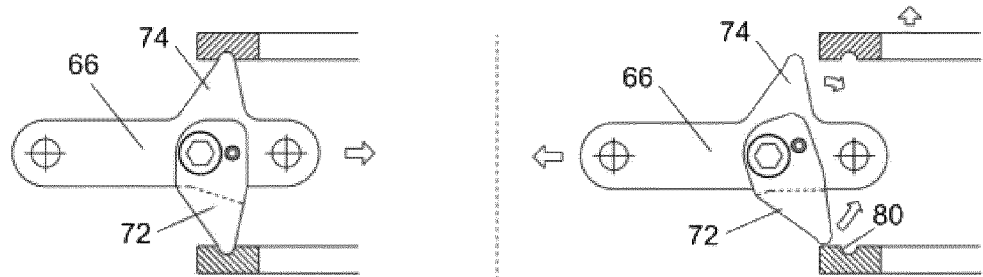
FIG. 15 is a detailed view of a first embodiment of a weak link latch, with one movable arm
Figure 16:
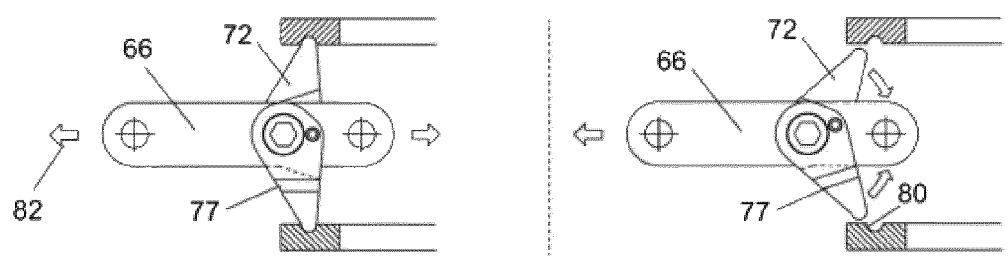
FIG. 16 is a detailed view of an alternate embodiment of a weak link latch, with two movable arms

The interface device of the invention further comprises a weak link arrangement that permits a single pull line to pull both the conduit (via pull-in member 12) as well as the internally arranged cable at the same time. A weak link arrangement has a first part releasably connected to the pull-in member, and a second part more securely connected to the cable. When certain predetermined conditions are met, such as for example a predetermined pulling force, the first part will disengage from the pull-in member. Since the second part remains connected to the cable, the pull in line can continue to pull the cable once the abutment portion of the sleeve contacts the outer wall of the structure thus stopping the forward movement of the pull-in member. FIGS. 14-16 illustrate a preferred embodiment of a weak link latch 20.

Weak link latch 20 comprising an elongated central member 66. The central member has a first connection point 68 at a leading end of the central member, for example a connection hole or ring. The central member has a second connection point 70 at a trailing end of the central member.

Two or more locking arms 72 project laterally from the central member, at least one of which is rotatable. FIGS. 14 and 15 illustrate a first embodiment where only one of said arms is rotatable. According a first embodiment, a rigid arm 74 extends laterally on one side of the central member while a rotatable arm 72 projects from the opposite side of the central member. Arm 72 is rotatable about an axle member 76. Rigid arm 74 is, according to one aspect, an extension of the material of the central member, but may alternatively be a separate component rigidly affixed to the central member.

A shear pin 78 passes through an opening in rotatable arm 72 to central member 66. The shear pin has a predetermined breaking force.

The ends of the locking arms, when in a first extended and locked position, engage notches 80 on the interior surface of the leading end of pull-in member 12. The arms are held in the locked position by shear pin 78. When a pulling force is exerted in an intended pulling direction 82 by a pulling line 22, rotatable arm 72 will tend to rotate towards the trailing end of the central member, thus applying shear forces against the shear pin. When the breakage force of the shear pin is exceeded, the shear pin will break, allowing arm 72 to rotate about axle 76 to a collapsed, disengaged position, as shown in FIG. 15. The central member is thus free to be pulled out of pull-in member 12.

According to a second embodiment illustrated in FIG. 16, two rotatable arms 72 are employed.

A conical mantle 84 is mounted about the central member such that the weak link device can function as a nose piece for the pull-in member 12. The mantle helps prevent snags and keeps foreign matter from entering the conduit.

Figure 17:
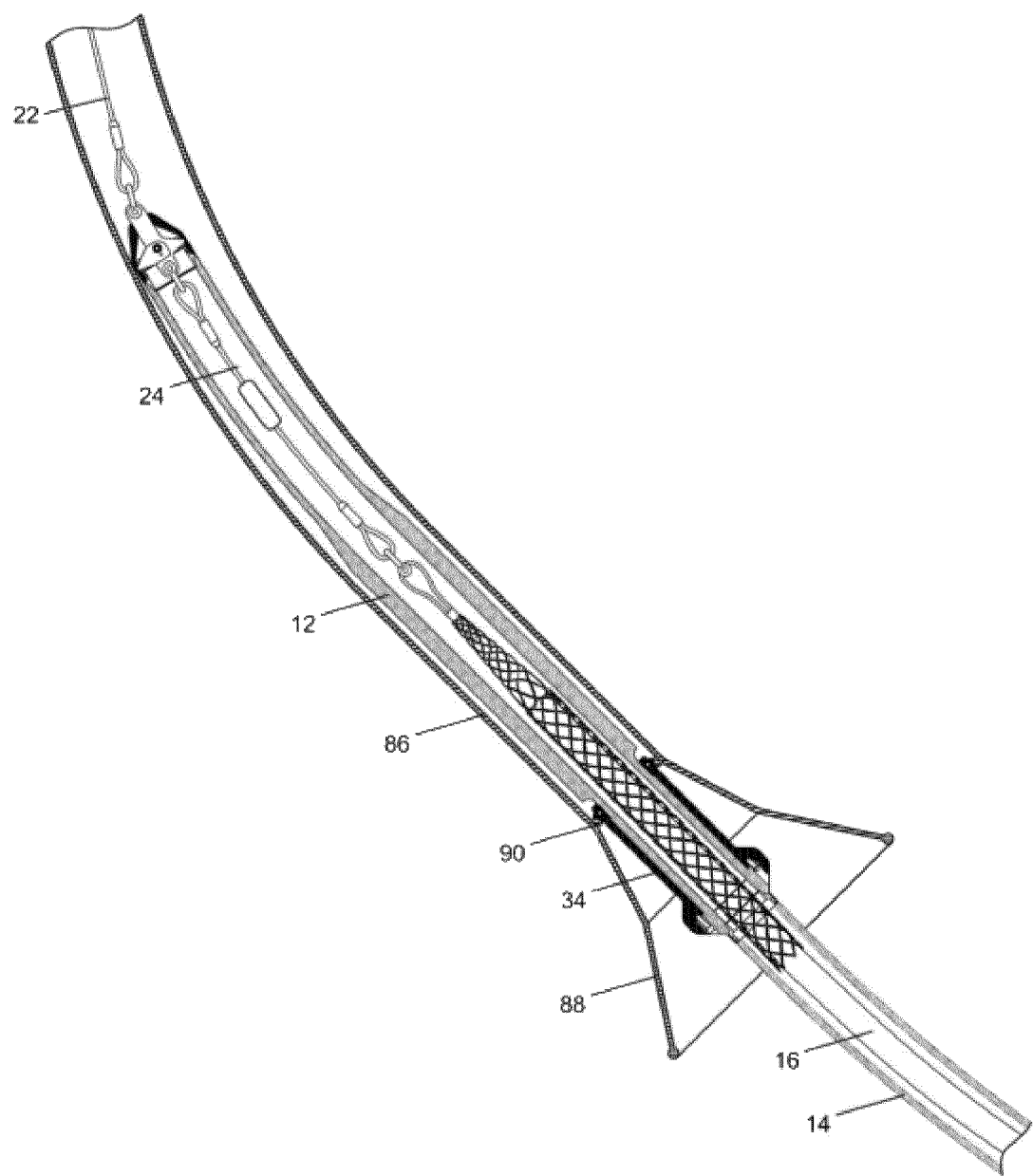
FIG. 17 is a cross sectional view of the interface device of the invention entering a J-Tube with bell mouth

FIG. 17 Illustrates the interface device of the invention pulled into a J-Tube 86 through a bell mouth 88. The bell mouth is equipped with a flange 90, against which teeth 40 engage when extended.

What is claimed is:

1. A foundation interface device comprising:
   an elongated, essentially cylindrical pull-in member arranged to be connected at its trailing end to a conduit in which is arranged a cable,
   a slidable sleeve longitudinally movable in relation to a portion of the pull-in member,
   one or more laterally extendable and retractable teeth connected to the slidable sleeve by a linkage whereby longitudinal movement of the sleeve is translated into a rotational movement of the teeth about an axis, said rotational movement extending and retracting the teeth in a lateral direction with respect to the pull-in member,
   said pull-in member arranged to be pulled into an opening in a subsea foundation in a forward direction, wherein the slidable sleeve comprises an abutment portion larger than the opening and arranged to abut an outer wall of the foundation thereby preventing the pull-in member from being pulled into the foundation beyond the abutment portion, and wherein the teeth, when in an extended position, are arranged to abut an inner wall of the foundation thereby preventing removal of the pull-in member in a rearward direction beyond the teeth, and wherein the teeth, when in a retracted position caused by the longitudinal movement of the sleeve, permit removal of the pull-in member from the opening in the rearward direction.

2. A foundation interface device according to claim 1, further comprising a weak-link connection member attached to the leading end of the pull-in member, said weak-link connection member having a first part releasably connected to the pull-in member and a second part connected to the cable, said weak-link connection member being further arranged to be connected to a pull line for pulling in a forward direction, the weak-link connection member arranged to disengage from the pull-in member in response to a predetermined pulling force, while the cable remains connected to the second part.

3. A foundation interface device according to claim 1, wherein the pull-in member is made of a continuous piece of a flexible material, and arranged to function as a bend restrictor.

4. A foundation interface device according to claim 1, wherein the weak-link connection member is a weak-link latch comprising an elongated connection member having a forward connection part for connection to the pull line, a rearward connection part for connection to a connecting line attached to the cable, and one or more arms arranged to engage the leading end of pull-in member, at least one of which arms is movable from a locked position engaged with the pull-in member to an unlocked position disengaged from the pull-in member.

5. A foundation interface device according to claim 4, wherein the movable arm or arms are rotatable about, and connected to elongated connection member by an axle member, and further wherein the movable arm or arms are held in the locked position by a shear pin arranged to break in response to a predetermined pulling force.

6. A foundation interface device according to claim 4, wherein the movable arm or arms, when in the locked position, engage a groove at the leading end of the pull-in member.

7. A foundation interface device according to claim 1, wherein the laterally extendable teeth are rotatably connected to the leading end of the slidable sleeve by an axle pin, and arranged such that, when slidable sleeve moves in the rearward direction a portion of the extendable teeth will abut a contact plate causing the teeth to rotate about the axle pin into the extended position.

8. A foundation interface device according to claim 1, wherein the laterally extendable teeth are rotatably connected to the leading end of the slidable sleeve by an axle pin, and arranged such that, when slidable sleeve moves in the rearward direction, the teeth will ride up upon a ramp rotating the teeth into the extended position.

9. A foundation interface device according to claim 8, wherein the locking mechanism comprises a pin connected to the slidable sleeve, said pin having an enlarged head made of a deformable material arranged to be inserted into locking engagement with a chamber in the collar, said chamber having an opening slightly smaller than the enlarged head.

10. A foundation interface device according to claim 8, wherein the locking mechanism comprises a rocker arm arranged at the trailing end of slidable sleeve, the rocker having a notch arranged to engage a ridge on the collar.

11. A foundation interface device according to claim 8, wherein the rocker arm further comprises a release plunger for disengaging the notch from the ridge.

12. A foundation interface device according to claim 1, further comprising a collar arranged on the pull-in member rearward of the sliding sleeve, and further comprising a locking mechanism for locking the sleeve in the rearward position.

13. A foundation interface device according to claim 12, wherein the collar comprises a threaded passage adapted for receiving a threaded key, whereby the threaded key may be rotated to press slidable sleeve forward and disengage head from chamber.

14. A foundation interface device according to claim 1 wherein the slidable sleeve further comprises a rearward extending lip extending over a collar, arranged to prevent debris from entering the space between the slidable sleeve and the collar when the slidable sleeve is in the forward position.

15. A foundation interface device according to claim 1, wherein the pull-in member is made of a fiber reinforced polymer material.

16. A method for removing a foundation interface device from a subsea foundation, comprising:
Providing a cylindrical foundation interface device having a plurality of extendable and retractable teeth arranged, in the extended position, to engage an inner wall of a subsea foundation about an opening so as to prevent removal of the interface device from the opening, said teeth being connected to a slidable sleeve arranged coaxially with a portion of the pull-in member, and longitudinally movable in relation to said portion of the pull-in member such that longitudinal movement of the sleeve is translated to a rotational, retracting movement of the teeth,
longitudinally moving the sleeve of an installed interface device so as to retract the teeth, and
removing the interface device from the foundation.

17. A method for removing a foundation interface device according to claim 16, wherein the interface device further comprises a locking means for locking the slidable sleeve so as to prevent an unintended retraction of the teeth, and the method further comprises the step of disengaging the locking means.

18. A foundation interface device comprising:
an elongated, essentially cylindrical pull-in member arranged to be pulled into an opening in a subsea foundation, the pull-in member having a leading end and a trailing end, and being adapted for connection at said trailing end to a conduit, wherein a cable is arranged in the conduit,
a slidable sleeve longitudinally movable in relation to a portion of the pull-in member,
said slidable sleeve having a leading end and a trailing end, and an abutment portion arranged to abut against the opening when the leading end of the pull-in member is pulled through the opening, and wherein abutment of the abutment portion against the wall of the structure when the pull-in member is pulled through the opening causes the slidable sleeve to slide relative to the pull-in member from an initial forward position to a subsequent rearward position,
one or more laterally extendable and retractable teeth arranged at the leading end of the slidable sleeve and connected to the slidable sleeve by a linkage, wherein the linkage is adapted to translate longitudinal movement of the sleeve relative to the pull-in member into movement of the teeth in a lateral direction with respect to the pull-in member between a radially extended position and a radially retracted position,
wherein said pull-in member is arranged to be pulled into said opening in a forward direction, wherein the abutment portion is larger than the opening and arranged to abut an outer wall of the foundation thereby preventing the pull-in member from being pulled into the foundation beyond the abutment portion, and wherein the teeth, when in the radially extended position, are arranged to abut an inner wall of the foundation thereby preventing removal of the pull-in member in a rearward direction beyond the teeth, and wherein the teeth, when in the retracted position caused by the longitudinal movement of the sleeve to the forward position permit removal of the pull-in member from the opening in the rearward direction.

19. A foundation interface device according to claim 18, further comprising a weak-link connection member attached to the leading end of the pull-in member, said weak-link connection member having a first part releasably connected to the pull-in member and a second part connected to the cable, said weak-link connection member being further arranged to be connected to a pull line for pulling in a forward direction, the weak-link connection member arranged to disengage from the pull-in member in response to a predetermined pulling force, while the cable remains connected to the second part.

20. A foundation interface device comprising:
an elongated, essentially cylindrical pull-in member having a leading end and a trailing and arranged to be connected at its trailing end to a conduit in which is arranged a cable,
a weak-link connection member attached to the leading end of the pull-in member, said weak-link connection member having a first part releasably connected to the pull-in member and a second part connected to the cable, said weak-link connection member being further arranged to be connected to a pull line for pulling in a forward direction, the weak-link connection member being arranged to disengage from the pull-in member in response to a predetermined pulling force, while the cable remains connected to the second part, a slidable sleeve longitudinally movable in relation to a portion of the pull-in member, said sliding sleeve having an abutment portion arranged to abut against an opening in a wall of a structure, whereby in the event that the pull-in member is pulled by a pull line through said opening, the abutment portion will abut against the wall causing the slidable sleeve to slide from an initial forward position to a subsequent rearward position, one or more laterally extendable and retractable teeth arranged at the leading end of the slidable sleeve and connected to the slidable sleeve by a linkage whereby longitudinal movement of the sleeve from the forward position or the rearward position is translated into a rotational movement of the teeth about an axis, said rotational movement extending or retracting the teeth in a lateral direction with respect to the pull-in member, said pull-in member being arranged to be pulled into an opening in a subsea foundation in a forward direction, wherein the abutment portion is larger than the opening and arranged to abut an outer wall of the foundation thereby preventing the pull-in member from being pulled into the foundation beyond the abutment portion, and wherein the teeth, when in an extended position, are arranged to abut an inner wall of the foundation thereby preventing removal of the pull-in member in a rearward direction beyond the teeth, and wherein the teeth, when in a retracted position caused by the longitudinal movement of the sleeve, permit removal of the pull-in member from the opening in the rearward direction.

\* \* \* \* \*